(12) United States Patent
Kim et al.

(10) Patent No.: US 9,715,732 B2
(45) Date of Patent: Jul. 25, 2017

(54) APPARATUS AND METHOD FOR RECONSTRUCTING MEDICAL IMAGE

(71) Applicants: Vatech Co., Ltd., Gyeonggi-do (KR); Vatech Ewoo Holdings Co., Ltd., Gyeonggi-do (KR)

(72) Inventors: Keun-Yeong Kim, Gyeonggi-do (KR); Sung Il Choi, Gyeonggi-do (KR); Tae Woo Kim, Gyeonggi-do (KR)

(73) Assignees: VATECH Co., Ltd., Gyeonggi-do (KR); VATECH EWOO Holdings Co., Ltd., Gyeonggi-do (KR)

( * ) Notice: Subject to any disclaimer, the term of this patent is extended or adjusted under 35 U.S.C. 154(b) by 67 days.

(21) Appl. No.: 14/938,953

(22) Filed: Nov. 12, 2015

(65) Prior Publication Data

US 2016/0148399 A1    May 26, 2016

(30) Foreign Application Priority Data

Nov. 11, 2014    (KR) .................... 10-2014-0155927

(51) Int. Cl.
 *G06T 7/00*    (2017.01)
 *G06T 19/00*    (2011.01)
(52) U.S. Cl.
 CPC .............. *G06T 7/003* (2013.01); *G06T 19/00* (2013.01); *G06T 2219/008* (2013.01)
(58) Field of Classification Search
 CPC ......... G06T 7/30; G06T 11/008; G06T 19/00; G06T 2219/008; A61B 6/5217; A61B 6/5223
 See application file for complete search history.

(56) References Cited

U.S. PATENT DOCUMENTS

| 7,315,636 B2 * | 1/2008 | Kuduvalli ..................... 382/128 |
| 2013/0331697 A1 | 12/2013 | Park et al. ............. A61B 8/463 |
| 2014/0015836 A1 * | 1/2014 | Neubauer et al. .... G06T 11/003 345/427 |
| 2015/0269766 A1 * | 9/2015 | Kobayashi .............. G06T 15/00 345/419 |

FOREIGN PATENT DOCUMENTS

KR    10-2013-0138612 A    12/2013    ............... A61B 8/14

* cited by examiner

*Primary Examiner* — Andrew W Johns

(74) *Attorney, Agent, or Firm* — IP Legal Services, LLC

(57) ABSTRACT

The preset invention relates to an apparatus and a method for reconstructing a medical image for obtaining a 2D medical image (for example, a Cephalo image) from a 3D medical image (for example, a CT image), and a computer-readable recording medium keeping a program for implementing the method. In detail, the present invention provides an apparatus for reconstructing a medical image that includes: a 3D medical image obtaining unit obtaining 3D medical image information for making a 3D medical image of an object; a medical image overlapping unit overlapping the 3D medical image information in accordance with a radial beam path in a projection direction of a 2D medical image; and a 2D medical image obtaining unit obtaining and displaying the 2D medical image based on the overlapping result, and a method of reconstructing a medical image.

13 Claims, 10 Drawing Sheets

APPARATUS AND METHOD FOR RECONSTRUCTING MEDICAL IMAGE

CROSS REFERENCE TO PRIOR APPLICATIONS

The present application claims priority under 35 U.S.C. §119 to Korean Patent Application No. 10-2014-0155927 (filed on Nov. 11, 2014).

BACKGROUND OF THE INVENTION

Field of the Invention

The present invention relates to an apparatus and a method for reconstructing a medical image for keeping a program for implementing the method. More particularly, the present invention relates to an apparatus and a method for reconstructing a medical image that obtains a 2D medical image (for example, a Cephalo image) from a 3D image (for example, CT (Computed Tomography) image), for keeping a program for implementing the method.

CT images will be exemplified as 3D medical images and Cephalo images will be exemplified as 2D medical images in the following embodiments of the present invention, but is should be noted that the present invention is not limited thereto.

Description of the Related Art

In general, 3D medical images obtained, for example, using CT and ultrasonic tests have the advantage of making it possible to clearly assess the entire object at a glance. However, it may be effective to use a 2D medical image rather than a 3D medical image in order to make a closer observation of internal cross-sections of an object. Accordingly, if a 3D medical image and a 2D medical image are simultaneously displayed, a user can closely observe the entire object.

A way of simultaneously displaying a 3D medical image and a 2D medical image has been disclosed in Korean Patent Application Publication No. 10-2013-0138612 (published on 19 Dec. 2013), which is as follows.

The apparatus for displaying a 3D medical image and a 2D medical image in the document includes a 3D image obtaining unit that obtains 3D medical images of an object, a cross-section selecting unit that selects at least one cross-section of the object on the basis of input from the outside about the obtained 3D medical images, a 2D image obtaining unit that obtains a 2D medical image corresponding to the selected at least one cross-section by scanning the object, and a display unit that displays 2D medical images and 3D medical images.

The cross-section selecting unit includes a window creator that creates at least one window to be positioned on an obtained 3D medical image, a window controller that moves the created at least one window on the 3D medical image, and an additional cross-section selector that additionally selects at least one cross-section adjacent to the selected at least one cross-section.

The 2D image obtaining unit includes a first image obtaining unit that obtains at least one first 2D medical image by scanning an object to correspond to a selected at least one cross-section, a second image obtaining unit that obtains at least one second 2D medical image by scanning an object to correspond to at least one cross-section adjacent to a cross-section, and a combined image obtaining unit that obtains at least one combined 2D medical image by combining at least one first 2D medical image with at least one second 2D medical image.

However, the apparatus can obtain at least one combined 2D medical image by combining a first 2D medical image of at least any one cross-section and a second 2D medical image of at least one cross-section adjacent to the cross-section, but cannot obtain a 2D overlapping medical image by selecting not cross-sections, but an entire area or a predetermined area and then overlapping medical images in the selected area (range).

This is because, the degrees of enlargement of 2D medical images of different cross-sections spaced at a predetermined distance or more from each other are different due to the characteristic of ultrasonic beams or an X-ray beams that are radiated in all direction, so when a 2D overlap medical image is obtained by obtaining medical image in a selected area (range) in the way of simply combining images, as in the apparatus, an inaccurate 2D overlap medical image is obtained.

SUMMARY OF THE INVENTION

Accordingly, the related art described above has the defect that it is impossible to obtain a 2D overlapping medical image by selecting the entire area or a predetermined area rather than cross-sections and then overlapping medical images in the selected area (range), and it is an object of the present invention to solve this problem.

The present invention has been made keeping in mind the above problems occurring in the related art, and is intended to propose an apparatus and a method for reconstructing a medical image for obtaining a 2D overlapping medical image by selecting not cross-sections, but the entire area or a predetermined area and a direction and then overlapping medical images in the selected area (range) in the selected direction in consideration of a radial beam path.

The objects of the invention are not limited to the objects described above, and other objects and advantages of the present invention stated herein may be easily understood from the following description and may be made clear by embodiments of the present invention. Further, it will be easily understood that the objects and advantages of the present invention can be accomplished by the configurations and combinations of configurations described in claims.

In order to achieve the above object, according to one aspect of the present invention, there is provided an apparatus for reconstructing a medical image that includes: a 3D medical image obtaining unit obtaining 3D medical image information for making a 3D medical image of an object; a medical image overlapping unit overlapping the 3D medical image information in accordance with a radial beam path in a projection direction of a 2D medical image; and a 2D medical image obtaining unit obtaining and displaying the 2D medical image based on the overlapping result.

According to another aspect of the present invention, there is provided a method of reconstructing a medical image that includes: (a) obtaining 3D medical image for making a 3D medical image of an object; (b) overlapping 3D medical image information in accordance with a radial beam path in a projection direction of a 2D medical image; and (c) obtaining and displaying the 2D medical image based on the overlapping result.

According to the present invention, since not cross-sections, but the entire or a predetermined area and a direction are selected and then medical images in the selected area (range) are overlapped in the selected direction in consideration of a radial beam path, it is possible to obtain a 2D medical image formed by overlapping medical images in a selected area for observation.

Further, according to the present invention, since two types of medical image data, for example, a 3D CT image and a 2D Cephalo image are obtained through one-time CT examination, it is possible to reduce a radiation dose to a subject (patient) thus reducing possibility of injury due to additional radiation that is applied when the medical images are independently obtained.

Further, according to the present invention, there is no need for mounting an arm ensuring a predetermined degree of enlargement over a predetermined level to achieve a Cephalo image scanner, and accordingly, it is possible to reduce the size of medical equipment and it is also possible to decrease the space needed for installing medical equipment.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The objects, features, and advantages of the present invention will be made clear from the following detailed description, and accordingly, those skilled in the art could easily implement the spirit of the present invention. Further, in describing the present invention, well-known functions or constructions will not be described in detail since they may unnecessarily obscure the understanding of the present invention.

Throughout this specification, a case in which any one part is connected with the other part includes a case in which the parts are directly connected with each other and a case in which the parts are indirectly connected with each other with other elements interposed therebetween. Further, unless explicitly described otherwise, "comprising" any components will be understood to imply the inclusion of other components rather than the exclusion of any other components. Further, even if some components are expressed by singular forms throughout the specification, the present invention is not limited thereto and the components may be plural parts.

Hereinafter, exemplary embodiments of the present invention will be described with reference to accompanying drawings.

Figure 1A:
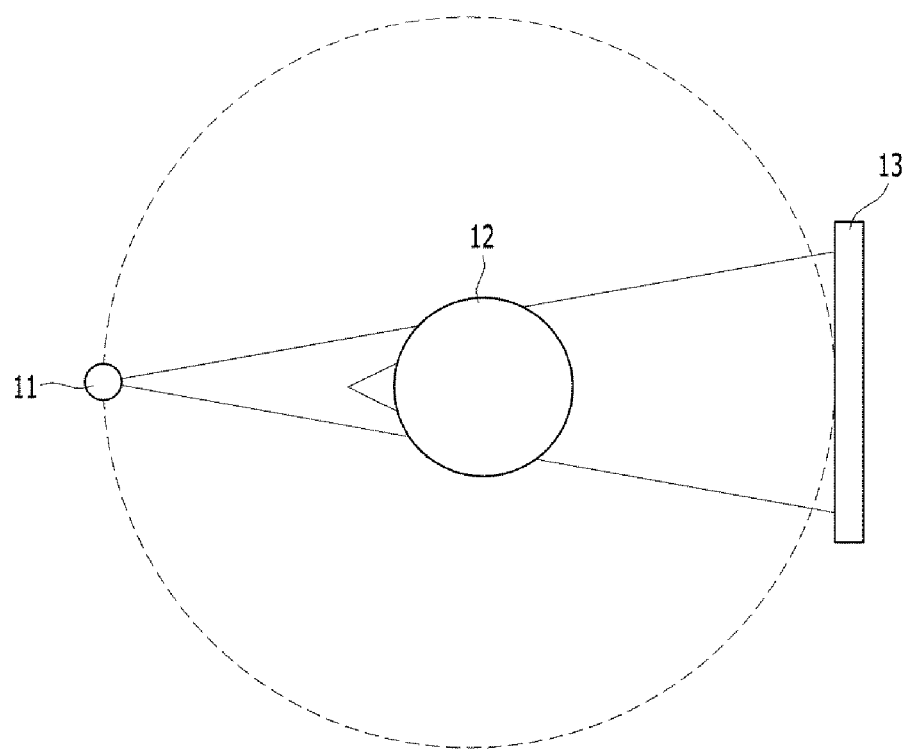
FIG. 1A is a view illustrating a process of obtaining a CT image according to an embodiment of the present invention.
Figure 1B:
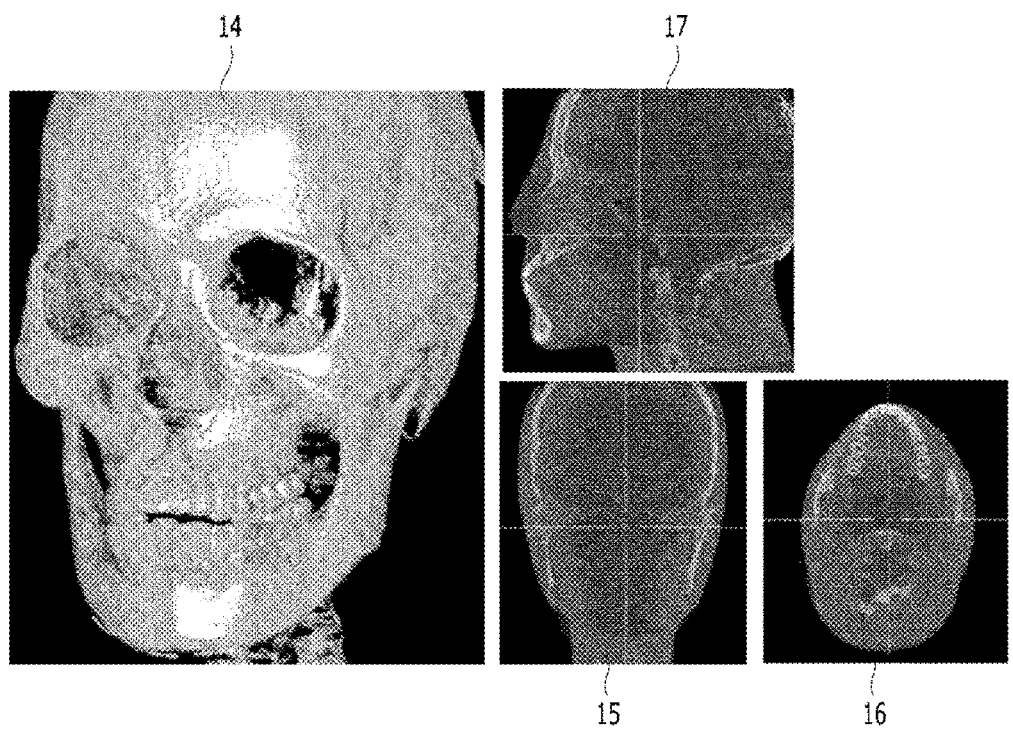
FIG. 1B is a view illustrating a process of a CT image according to an embodiment of the present invention.

FIG. 1A is a view illustrating a process of obtaining a CT image according to an embodiment of the present invention and FIG. 1B is a view illustrating a process of a CT image according to an embodiment of the present invention.

As shown in FIG. 1A, in a CT (Computed Tomography) scanner, an X-ray generator 11 and an X-ray detector 13 such as a sensor are disposed opposite to each other with an object 12 therebetween. While the X-ray generator 11 and the X-ray detector 13 revolve with the object 12 therebetween, X-rays are radiated to the object 12 in several directions from the X-ray generator 11, the X-rays passing through the object 12 are detected by the X-ray detector 13, and then a 3D medical image is obtained by reconstructing data of the detected X-rays. The X-rays are radial beams, as shown in FIG. 1A. That is, the X-rays radially spread while they travel forward.

For example, the image indicated by "14" in FIG. 1B is the 3D medical image obtained from the configuration shown in FIG. 1A. The 3D medical image 14 has all cross-sectional information about all directions, that is, a coronal direction (front-rear direction), an axial direction (up-down direction), and a sagittal direction (left-right direction). Accordingly, by using the cross-sectional information in the coronal direction and the sagittal direction included in the 3D medical image 14, it is possible to obtain a PA (Posteriora-Anterior) Cephalo image 15 formed by overlapping the cross-sectional information in the coronal direction (front-rear direction) and a LAT (Lateral) Cephalo image 17 having the cross-sectional information overlapped in the sagittal direction (left-right direction), and if necessarily, it may be possible to obtain a Cephalo image 16 formed by overlapping the cross-sectional information in the axial direction (up-down direction).

Figure 1C:
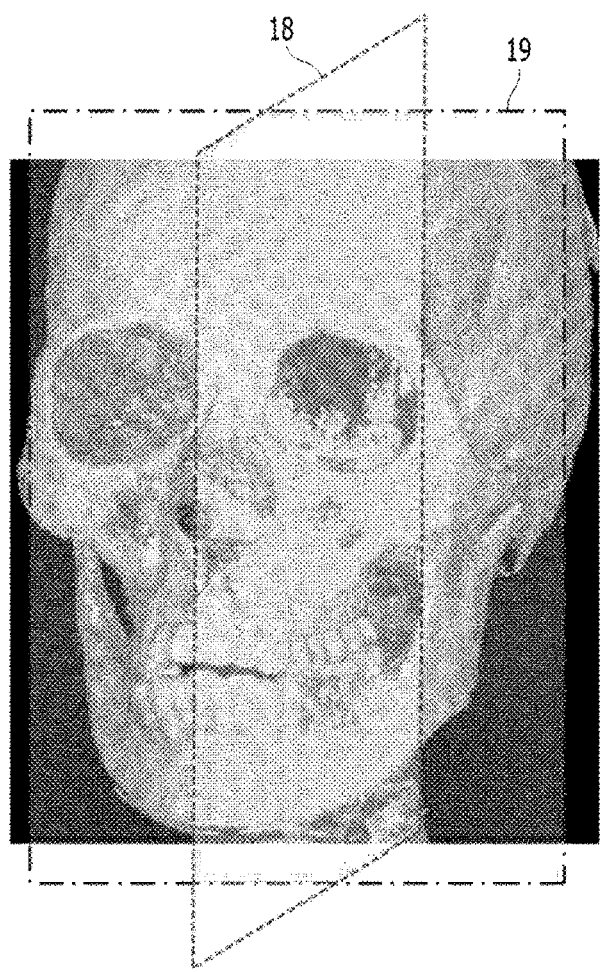
FIG. 1C is a view illustrating a selected direction and a selected area (range) for reconstructing a Cephalo image according to an embodiment of the present invention.
Figure 1D:
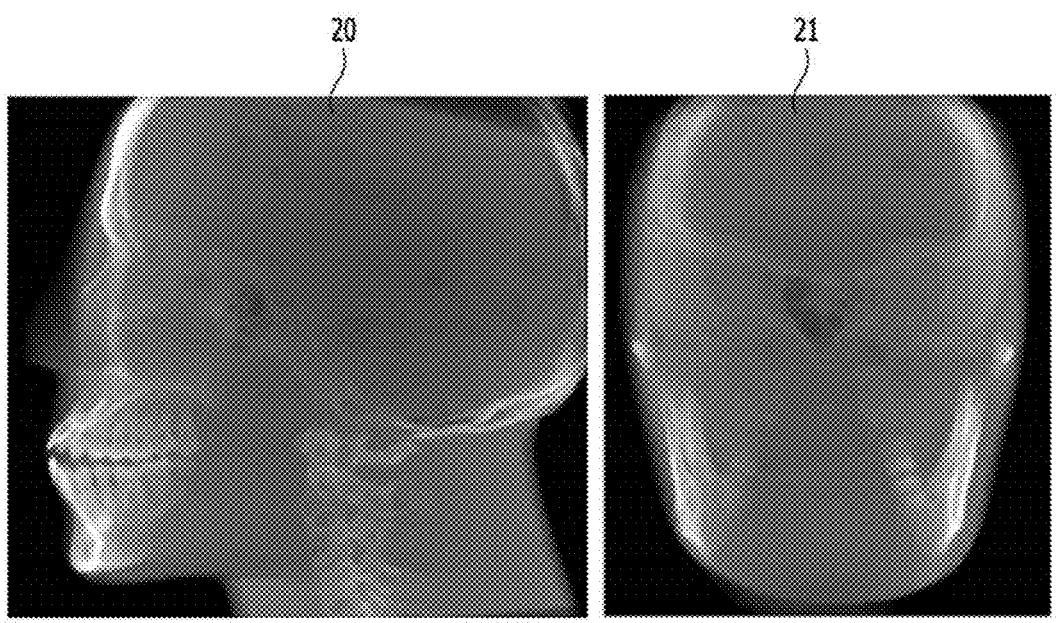
FIG. 1D is a view illustrating a reconstructed Cephalo image according to an embodiment of the present invention.

FIG. 1C is a view illustrating a selected direction and a selected area (range) for reconstructing a Cephalo image according to an embodiment of the present invention and FIG. 1D is a view illustrating a reconstructed Cephalo image according to an embodiment of the present invention, in which a post-process has not yet been applied to the Cephalo images.

As shown in FIG. 1C, in an embodiment of the present invention, a LAT Cephalo image (20 in FIG. 1D) in a desired area selected for observation is obtained by overlapping the cross-sectional information in the sagittal direction (left direction or right direction) in consideration of a radial beam path after determining any one start point 18 in consideration, or a PA Cephalo image (21 in FIG. 1D) in a desired area selected for observation is obtained by overlapping the cross-sectional information in the coronal direction (forward direction of rearward direction) in consideration of a radial beam after determining another start point 19. In this way, if necessary, it is possible to obtain a Cephalo image formed by overlapping the cross-sectional information in the axial direction (upward direction or downward direction).

The selected area may be determined from the start points 18 and 19 to the end in the selected direction such that the cross-sectional area in the area overlap each other, as described above, or it may be determined from the start points 18 and 19 to a finish point in the selected direction such that the cross-sectional information in the area overlap each other.

The cross-sectional information in a selected area can by overlapped by summing or averaging the values of all cross-sectional information in the selected area, or through other ways known in the art.

Figure 2:
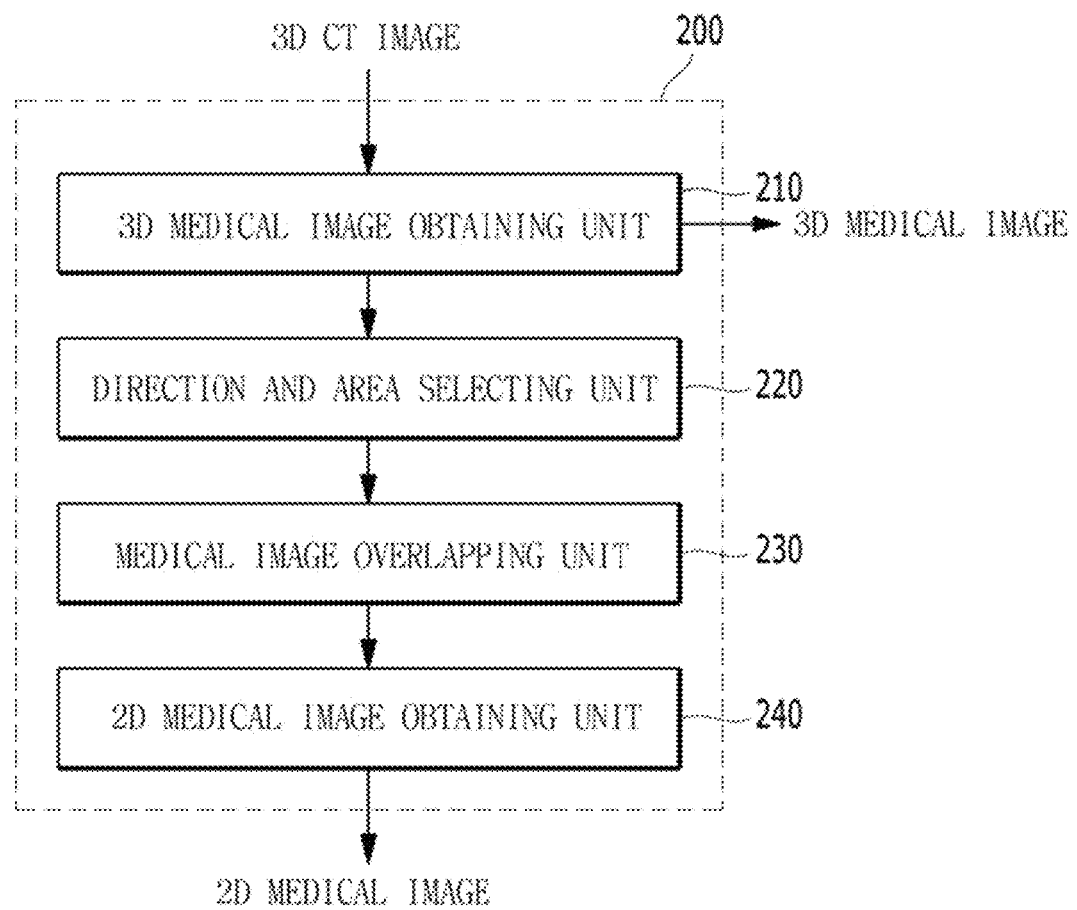
FIG. 2 is a diagram illustrating the configuration of an apparatus for reconstructing a medical image according to an embodiment of the present invention.
Figure 3:
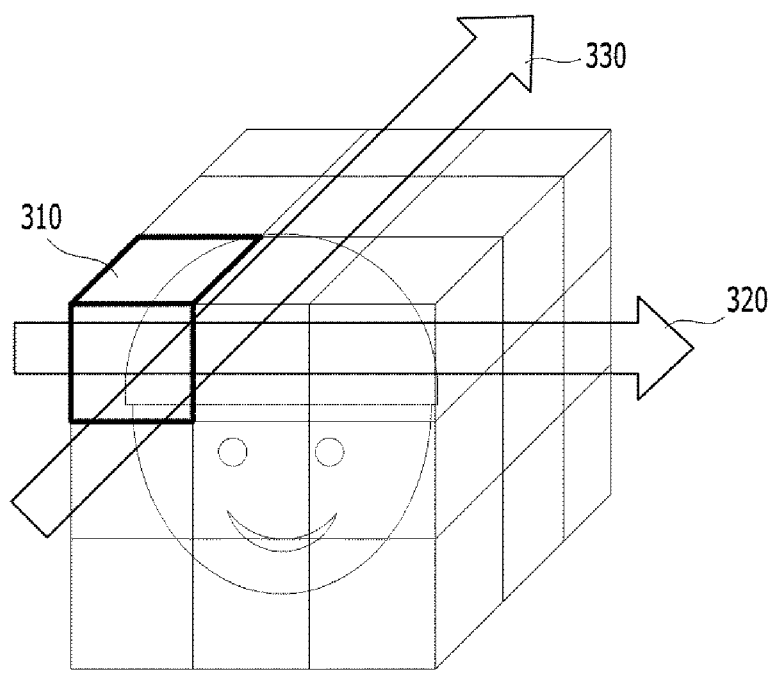
FIG. 3 is a view illustrating a process of selecting a direction and an area for a desired Cephalo image according to an embodiment of the present invention.
Figure 4:
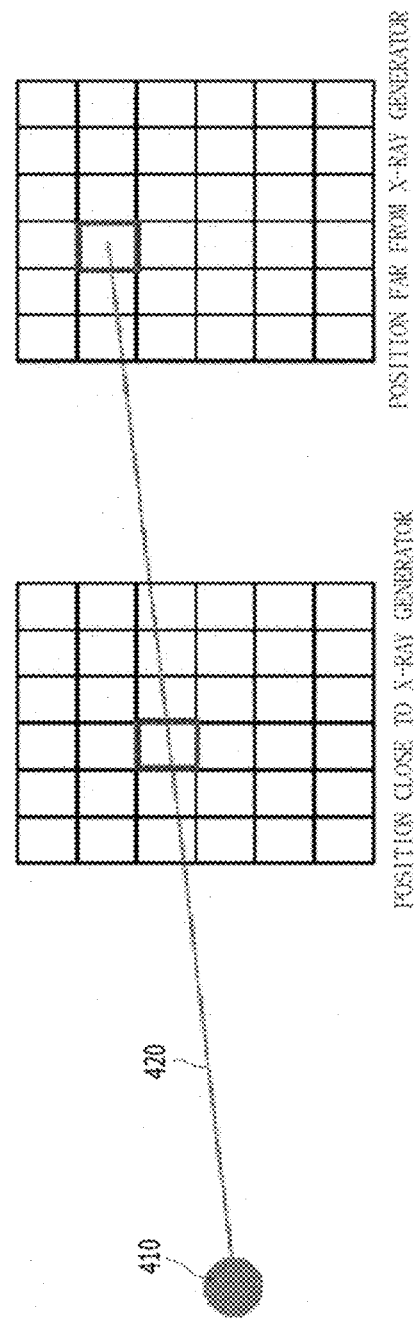
FIG. 4 is a view illustrating a process of overlapping medical images in consideration of a radial beam path according to an embodiment of the present invention.

FIG. 2 is a diagram illustrating the configuration of an apparatus for reconstructing a medical image according to an embodiment of the present invention, FIG. 3 is a view illustrating a process of selecting a direction and an area for a desired Cephalo image according to an embodiment of the present invention, and FIG. 4 is a view illustrating a process of overlapping medical images in consideration of a radial beam path according to an embodiment of the present invention.

As shown in FIG. 2, an apparatus 200 for reconstructing a medical image according to an embodiment of the present invention includes: a 3D medical image obtaining unit 210 for obtaining a 3D medical image; a direction and area selecting unit 220 for selecting a direction and an area, that is, a projection direction and a projection area in accordance with a 2D medical image of an object; a medical image overlapping unit 230 for overlapping cross-sectional information in the 3D medical image in the direction and area selected by the direction and area selecting unit 220 in consideration of a radial beam path; and a 2D medical image obtaining unit 240 for obtaining a 2D medical image according to the overlapping result in the medical image overlapping unit 230.

Next, the components are described in more detail with reference to FIGS. 2 to 4.

First, a CT scanner (not shown), for example, scans the head of a subject and transmits 3D CT information to the apparatus 200 for reconstructing a medical image. The CT scanner performs photographing with the same radiation dose (a first radiation dose) as in the related art.

The 3D medical image obtaining unit 210 receives the 3D CT image from the CT scanner and obtains a 3D medical image by applying a predetermined algorithm for reconstruction. The process of obtaining a 3D medical image in the 3D medical image obtaining unit 210 is well known in the art, so it is not described herein.

The direction and area selecting unit 220 selects a direction and an area according to a desired Cephalo image (2D medical image of an object, PA, and LAT). For example, as shown in FIG. 3, in order to obtain a LAT Cephalo image in the sagittal direction, it is possible to determine any one start point 310 and then select an area from the start point to the end point in the sagittal direction 320, or in order to obtain a PA Cephalo image in the coronal direction, it is possible to determine any one start point 310 and then select an area from the start point to the end point in the coronal direction 330. It is also possible to determine an axial direction and area in this way. The start point 310 can be set using a CT voxel.

The selected area may be determined from the start point 310 to the end point in the selected direction, but may be determined from another start point to a specific finish point in the selected direction.

For example, when a selected area is determined in advance (for example, a selected area is determined in advance from an end point to another end point), a direction selecting unit may be provided to select only the direction according to a desired Cephalo image (2D medical image of an object).

The medical image overlapping unit 230 overlaps the cross-sectional information in the 3D medical image in the direction and area selected by the direction and area selecting unit 220 in consideration of a radial beam path. The medical image overlapping unit 230 can sum up or average the values of the cross-sectional information in the 3D medical image in the selected area, or overlap them using other known ways.

In the process of overlapping 3D medical images in consideration of a radial beam path, as shown in FIG. 4, 3D medical images are overlapped using voxel matching according to the radial feature of an X-ray 420 generated by the X-ray generator 410. That is, the relative positions of voxels through which the same beam passes are different in cross-sections in accordance with the distance from the X-ray generator 410 due to the radial feature of the X-ray 420, 3D medical images are overlapped by voxel matching considering the relative positions in the cross-sections according to the radial beam path. Further, the enlargement rates of a voxel close to the X-ray generator 410 and a voxel far from the X-ray generator 410, that is, the ratios between the distance from the X-ray generator to a corresponding voxel and the distance from the X-ray generator to the X-ray detector are different due to the radial feature of the X-ray 420, so 3D medical images are overlapped through voxel matching considering the difference between the enlargement rate according to the radial beam path.

In detail, in this configuration, an image having the size of an actual object can be obtained for the imaging characteristic of computed tomography and there is no difference in enlargement rate at each position of a voxel. However, images far from an X-ray detector are enlarged due to the radial feature of an X-ray in actual Cephalo images. Accordingly, measurement methods considering the degree of enlargement according to the distance have been proposed in the field of orthodontics, and a 2D Cephalo image is obtained by summing or averaging voxel values in consideration of the difference in enlargement rate according to a radial beam path in an embodiment of the present invention to satisfy the standards for this measurement.

In other words, when a desired direction and a desired area are selected by the direction and area selecting unit 220, the medical image overlapping unit 230 sets a radial beam path to be radiated to a 3D medical image in the selected direction from a point in the selected direction outside the 3D medical image and overlaps cross-sectional information of a 3D medical image perpendicular to the selected direction as large as the selected area so that the relative position and enlargement rate of a voxel in each cross-section to the radial beam path are reflected.

Overlapping of cross-sectional information can be achieved by summing or averaging, but averaging that has been developed to suppress an increase in background may result in reduction of a signal for a lesion, so a contrast compensation method such as selecting an average area or giving a weight to an object (giving a weight to a critical value) may be used.

The 2D medical image obtaining unit 240 obtains and outputs a 2D medical image (2D Cephalo image) using the overlapping result by the medical image overlapping unit 230.

As described above, according to an embodiment of the present invention, it is possible to obtain two kinds of image data such as a 3D CT image and a 2D Cephalo image through one-time CT examination.

Further, as described above, the embodiment of the present invention can be used to remove additional injury to a patient due to X-rays when there is a need for additionally obtaining a Cephalo image after a CT examination, but as another embodiment of the present invention, CT only for obtaining a Cephalo image is possible, in which the radiation dose can be decreased to the level for the existing one-shot Cephalo tomography. In scanning with a low radiation dose, it may be possible to reduce Fps (Frame per second) and radiating X-rays in only a predetermined direction in order to compensate for the low radiation dose, corresponding streaks can be reduced basically through summing or averaging or by adding a projection. Further, it is possible to reduce time taken to obtain an image by directly obtaining a Cephalo image without CT, by selecting voxels (a 3D pixel) in a selected direction for a Cephalo image and then reconstructing data from the voxels. Another embodiment of the present invention is described hereafter with reference to FIGS. 5 and 6.

Figure 5:
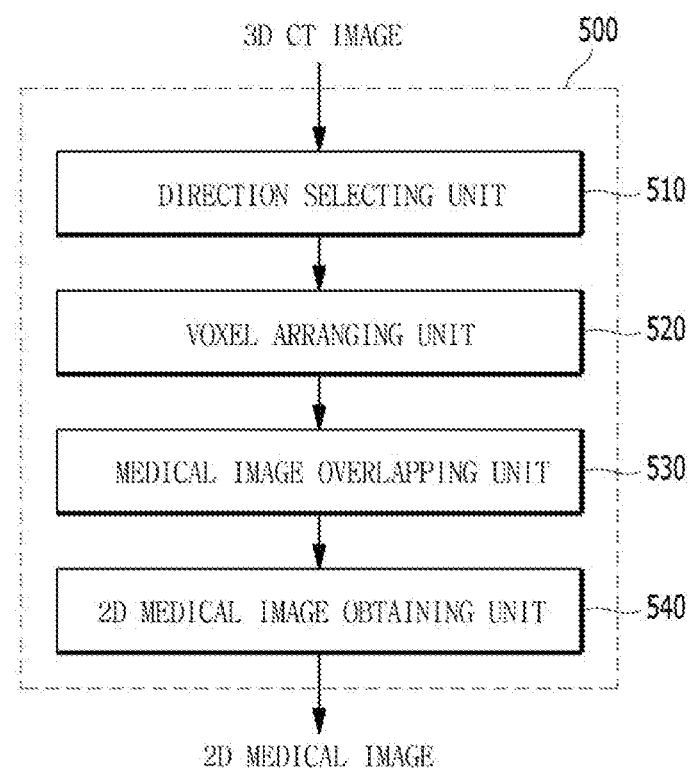
FIG. 5 is a diagram illustrating the configuration of an apparatus for reconstructing a medical image according to another embodiment of the present invention.
Figure 6:
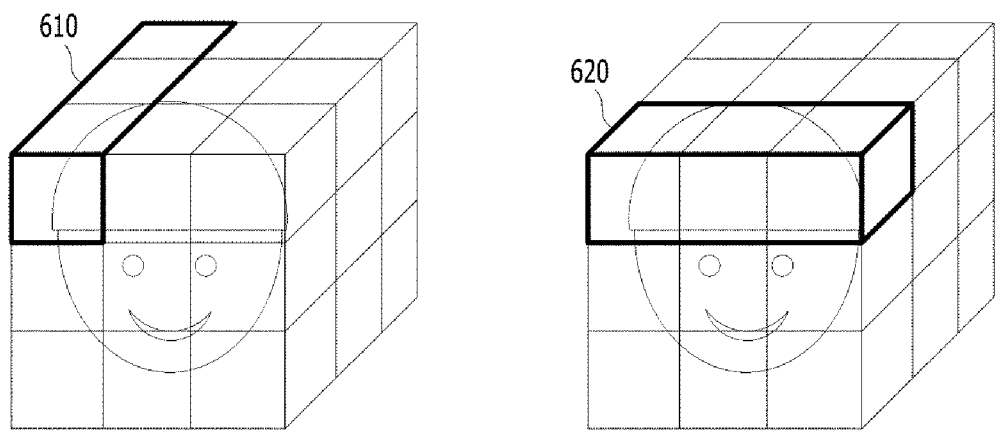
FIG. 6 is a view illustrating a process of selecting a direction and an area for a desired Cephalo image according to another embodiment of the present invention.

FIG. 5 is a diagram illustrating the configuration of an apparatus for reconstructing a medical image according to another embodiment of the present invention and FIG. 6 is a view illustrating a process of selecting a direction and an area for a desired Cephalo image according to another embodiment of the present invention.

As shown in FIG. 5, an apparatus 500 for reconstructing a medical image according to another embodiment of the present invention includes a direction selecting unit 510 for selecting a direction according to a 2D medical image of an object, a voxel arranging unit 520 for selecting and arranging voxels in the direction selected by the direction selecting unit 510, a medical image overlapping unit 530 for overlapping 3D medical images in the voxels arranged by the voxel arranging unit 520 in the direction selected by the direction selecting unit 510, in consideration of a radial beam path, and a 2D medical image obtaining unit 540 for obtaining a 2D medical image according to the overlapping in the medical image overlapping unit 530.

Next, the components are described in more detail with reference to FIGS. 5 and 6.

First, a CT scanner (not shown) scans the head of a subject, as an example. The CT scanner performs scanning with a low radiation dose (a second radiation dose) for obtaining a Cephalo image. The second radiation dose may be ⅕ of the first radiation dose. Methods of compensating for a low radiation dose such as reducing Fps or radiating X-rays to a predetermined section may be used.

The direction selecting unit 510 selects a direction for a desired Cephalo image (a 2D medical image of an object). For example, a sagittal direction is selected in order to obtain a LAT Cephalo image and a coronal direction is selected to obtain a PA Cephalo image. An axial direction can also be selected in this way.

The voxel arranging unit 520 selects only the voxels in the direction selected by the direction selecting unit 510, so the number of unnecessary voxels can be reduced and the calculation speed can be improved. For example, as shown in FIG. 6, the voxel arranging unit 520 selects and arranges a plurality of first voxels 620 when a sagittal direction is selected, and selects and arranges a plurality of second voxels 610 when a coronal direction is selected.

The voxel arranging unit 520 may further perform a function of setting a selected area from a predetermined voxel to a specific finish point or the end point. Alternatively, a selected area may be determined in advance. Further, it may be possible to determine a selected area, using not the voxel arranging unit, but a direction and area selecting unit, as described above.

In this process, selecting a direction by the direction selecting unit 510 and arranging voxels by the voxel arranging unit 520 may be made before scanning by the CT scanner (not shown). In other words, it is possible to obtain a 3D CT image with a low radiation dose after the direction selecting unit 510 selects a direction and then the voxel arranging unit 520 arranges voxels.

The medical image overlapping unit 530 obtains a 3D medical image through reconstruction on the arranged voxels (for example, common CT reconstruction) and overlaps 3D medical image in the selected area in the direction selected by the direction selecting unit 510 in consideration of a radial beam path. The medical image overlapping unit 530 can sum or average the 3D medical images in the selected area, or overlap them using other known ways. In the process of overlapping 3D medical images in consideration of a radial beam path, as described above with reference to FIG. 4, 3D medical images are overlapped using voxel matching according to the radial feature of an X-ray 420 generated by the X-ray generator 410.

The 2D medical image obtaining unit 540 obtains and outputs a 2D medical image (2D Cephalo image) using the overlapping result by the medical image overlapping unit 530.

According to another embodiment of the present invention, it is possible to obtain a 2D Cephalo image by reconstructing a 3D CT image obtained by a medical scanner (for example, a CT scanner) without a Cephalo scanning function.

Figure 7:
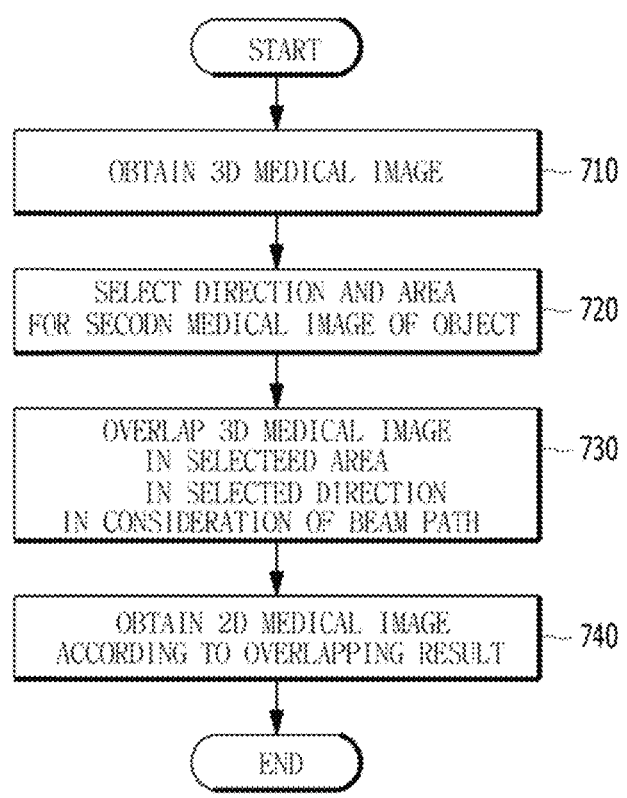
FIG. 7 is a flowchart illustrating a method of reconstructing a medical image according to an embodiment of the present invention.

FIG. 7 is a flowchart illustrating a method of reconstructing a medical image according to an embodiment of the present invention, but a detailed embodiment was described in relation to the apparatus for reconstructing a medical image shown in FIGS. 2 to 4, so only the operation is simply described in this embodiment.

First, the 3D medical image obtaining unit 210 obtains a 3D medical image (710).

The direction and area selecting unit 220 selects a direction and an area for a 2D medical image of an object (720).

The medical image overlapping unit 230 overlaps the 3D medical images in the area selected by the direction and area selecting unit 220 in the direction selected by the direction and area selecting unit 220 in consideration of a radial beam path (730). For example, when a desired direction and a desired area are selected by the direction and area selecting unit 220, the medical image overlapping unit 230 sets a radial beam path to be radiated to a 3D medical image in the selected direction from a point in the selected direction outside the 3D medical image and overlaps cross-sectional information of a 3D medical image perpendicular to the selected direction as large as the selected area so that the relative position and enlargement rate of each cross-section to the radial beam path are reflected.

The 2D medical image obtaining unit 240 obtains a 2D medical image according to the overlapping result by the medical image overlapping unit 230 (740).

Figure 8:
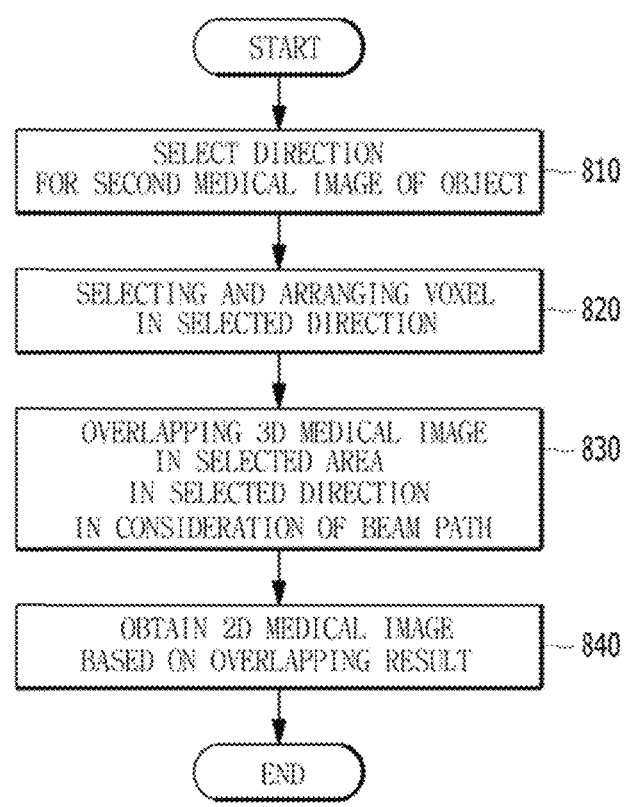
FIG. 8 is a flowchart illustrating a method of reconstructing a medical image according to another embodiment of the present invention.

FIG. 8 is a flowchart illustrating a method of reconstructing a medical image according to another embodiment of the present invention, but a detailed embodiment was described in relation to the apparatus for reconstructing a medical image shown in FIGS. 5 and 6, so only the operation is simply described in this embodiment.

First, the direction selecting unit 510 selects a direction for a 2D medical image of an object (810).

The voxel arranging unit 520 selects and arranges voxels in the direction selected by the direction selecting unit 510 (820).

A 3D medical image is obtained through reconstruction on the voxels arranged by the voxel arranging unit 520 (for example, common CT construction).

The medical image overlapping unit 530 overlaps 3D medical images in the selected area in the direction selected by the direction selecting unit 510 in consideration of a radial beam path (830).

The 2D medical image obtaining unit 540 obtains a 2D medical image according to the overlapping result by the medical image overlapping unit 530 (840).

The method of reconstructing a medical image of the present invention can be achieved in the types of programming commands that can be executed by various computers, and can be recorded on computer-readable media. The computer-readable media may include program commands, data files, and data structures of combinations thereof. The program command that are recorded on the media may be those specifically designed and configure for the present invention or may be those available and known those engaged in computer software in the art. The computer-readable recording media include magnetic media such as hard disk, floppy disk, and magnetic tape, optical media such as CD-ROM and DVD, magneto-optical media such as floptical disk, and hardware devices specifically configured to store and execute program commands, such as ROM, RAM, and flash memory. The medium may be a transmission medium such as a metal wire or a waveguide for transmitting light including a carrier for transmitting signals designating program instructions and data structures. The program commands include not only mechanical languages made by a compiler, but high-class language codes that can be executed by a computer using an interpreter. The hardware device may be configured to operate as one or more software modules to perform the operation of the present invention, and vice versa.

Although the present invention was described with reference to limited embodiments and drawings, the present invention is not limited to the embodiments and may be changed and modified in various ways by those skilled in the art without departing from the spirit of the present invention described in claims.

What is claimed is:

1. An apparatus for reconstructing a medical image, comprising:
    a 3D medical image obtaining unit obtaining 3D medical image information for making a 3D medical image of an object;
    a medical image overlapping unit overlapping the 3D medical image information in accordance with a radial beam path in a projection direction of a 2D medical image; and
    a 2D medical image obtaining unit obtaining and displaying the 2D medical image based on the overlapping result.

2. The apparatus of claim 1, wherein the medical image overlapping unit overlaps cross-sectional information of the 3D medical image perpendicular to the projection direction in accordance with the radial beam path in the projection direction from a point in the projection direction outside the 3D medical image.

3. The apparatus of claim 2, wherein the medical image overlapping unit applies an enlargement rate of each cross-sectional information to the radial beam path when overlapping the cross-sectional information.

4. The apparatus of claim 2, wherein the medical image overlapping unit sum or averages values of the cross-sectional information of the 3D medical image when overlapping the cross-sectional information.

5. The apparatus of claim 1, further comprising a selecting unit selecting the projection direction of the second medical image.

6. The apparatus of claim 5, wherein the selecting unit further selects a projection area of the 2D medical image and the medical image overlapping unit overlaps 3D medical image information in the projection area along the radial beam path in the projection direction.

7. The apparatus of claim 1, wherein the 3D medical image obtaining unit includes an X-ray generator and an X-ray detector disposed opposite to each other and revolving with the object therebetween.

8. The apparatus of claim 1, wherein the 3D medical image is an X-ray CT image, the object is a head, and the 2D medical image is an X-ray Cephalo image.

9. A method of reconstructing a medical image, comprising:
    (a) obtaining 3D medical image for making a 3D medical image of an object;
    (b) overlapping 3D medical image information in accordance with a radial beam path in a projection direction of a 2D medical image; and
    (c) obtaining and displaying the 2D medical image based on the overlapping result.

10. The method of claim 9, wherein the step (b) overlaps cross-sectional information of the 3D medical image perpendicular to the projection direction in accordance with the radial beam path in the projection direction from a point in the projection direction outside the 3D medical image, in consideration of an enlargement rate of each cross-sectional information to the radial beam path.

11. The method of claim 10, wherein the step (b) sums or averages values of the cross-sectional information of the 3D medical image when overlapping the cross-sectional information.

12. The method of claim 9, further comprising:
    selecting a projection direction of the 2D medical image before the step (b) after the step (a).

13. The method of claim 12, further comprising:
    selecting a projection area of the 2D medical image before the step (b) after the step (a), wherein
    the step (b) overlaps 3D medical image information in the projection area along the radial beam path in the projection direction.

* * * * *